(12) United States Patent
Kaizu

(10) Patent No.: US 6,689,006 B2
(45) Date of Patent: Feb. 10, 2004

(54) CONTROL DEVICE FOR AUTOMATIC TRANSMISSION

(75) Inventor: Kenichi Kaizu, Fuji (JP)

(73) Assignee: Jatco LTD (JP)

( * ) Notice: Subject to any disclaimer, the term of this patent is extended or adjusted under 35 U.S.C. 154(b) by 0 days.

(21) Appl. No.: 10/253,569

(22) Filed: Sep. 24, 2002

(65) Prior Publication Data

US 2003/0064850 A1 Apr. 3, 2003

(30) Foreign Application Priority Data

Sep. 28, 2001 (JP) ........................................ 2001-302801

(51) Int. Cl.[7] .............................................. B60K 41/24
(52) U.S. Cl. ........................ 475/127; 475/127; 475/165
(58) Field of Search ................................. 475/127, 128, 475/165

(56) References Cited

U.S. PATENT DOCUMENTS

| | | | | |
|---|---|---|---|---|
| 3,896,685 A | * | 7/1975 | Shellman | 477/156 |
| 4,903,551 A | * | 2/1990 | Hiramatsu et al. | 477/131 |
| 4,941,370 A | * | 7/1990 | Ishii | 475/128 |
| 5,288,279 A | * | 2/1994 | Sakai et al. | 475/127 |
| 5,441,459 A | * | 8/1995 | Inukai et al. | 475/127 |
| 5,836,845 A | * | 11/1998 | Sakaguchi et al. | 475/131 |
| 6,139,459 A | * | 10/2000 | Suzuki | 475/127 |
| 6,206,802 B1 | * | 3/2001 | Kim | 477/127 |
| 6,270,439 B1 | * | 8/2001 | Suzuki | 475/127 |
| 6,540,635 B1 | * | 4/2003 | Sano | 475/127 |

* cited by examiner

Primary Examiner—Rodney H. Bonck
Assistant Examiner—Eric M. Williams
(74) Attorney, Agent, or Firm—Rossi & Associates

(57) ABSTRACT

A second shift valve for a lock-up clutch is switched in response to supply of an R range pressure and a solenoid pressure from a low-and-reverse solenoid valve to selectively supply an output from a lock-up solenoid valve to a pressure reduction control valve or a lock-up control valve. The pressure reduction control valve regulates a line pressure at a small gain by the output from the lockup solenoid valve via the second shift valve. The first shift valve actuated by the solenoid pressure from the low-and-reverse solenoid valve selectively supplies a high R range pressure from a manual valve or an output from the pressure reduction control valve to the low-and-reverse brake. This enables accurate hydraulic control of the low-and-reverse brake and ensures the required torque capacity with simple arrangement.

6 Claims, 14 Drawing Sheets

Fig.2

| Gear Position | H/C | L/C | 26/B | 35R/C | L&R/B | OWC |
|---|---|---|---|---|---|---|
| REV |  |  |  | ○ | ○ |  |
| 1st |  | ○ |  |  | ○ | ○ |
| 2nd |  | ○ | ○ |  |  |  |
| 3rd |  | ○ |  | ○ |  |  |
| 4th | ○ | ○ |  |  |  |  |
| 5th | ○ |  |  | ○ |  |  |
| 6th | ○ |  | ○ |  |  |  |

Fig.5

A:Spring Compressed  B:Spring Tensioned  ○:Output  ×:No Output

| Function | | | L&R/B Original Pressure | (L&R/B) Shift Valve 30 | (L/U) Shift Valve 42 | Pressure Reduction Control Valve | L/U SOL | L&R SOL |
|---|---|---|---|---|---|---|---|---|
| 1st | R-Range Capacity Switching | Select | Pressure Reduction Control Valve | B | B | ○ | ○ | ○ |
| | | Stall | R-Range Pressure | A | B | ○ | ○ | × |
| | Eng.Brake | L/U Allowed (No Eng.Brake) | Drain | A | A | × | ○ | × |
| | | Eng.Brake | Pressure Reduction Control Valve | B | B | ○ | ○ | ○ |
| | L/U ON | | Drain | A | A | × | ○ | × |
| FWD | R-Range Avoided | | R-Range Select, L/U ON | B | B | × | × | ○ |
| | R-Range Select, Power Failed | | R-Range Pressure | A | B | × | × | × |

CONTROL DEVICE FOR AUTOMATIC TRANSMISSION

BACKGROUND OF THE INVENTION

1. Field of the Invention

This invention relates to a control device for an automatic transmission, and more particularly to a control device that controls supply and drain of oil pressure to and from frictional elements such as a low-and-reverse brake in rearward driving and 1-range driving.

2. Description of the Prior Art

A conventional control device has been disclosed in Japanese Laid-Open Patent Publication No. 2001-12588 which is intended to achieve favorable gear change characteristics by providing accurate control of supply and drain of oil pressure to and from frictional elements such as a low-and-reverse brake which are engaged at forward-driving low speed gear positions and a rearward driving gear position, and to ensure the torque capacity required for keeping the frictional elements engaged after a gear change by switching to a high pressure such as a line pressure or the like.

As shown in FIG. 1 of the above-mentioned publication, this control device enables accurate control by setting the gain of an output pressure Po from a pressure reduction control valve with respect to a solenoid pressure from a solenoid valve to a small value. If the output pressure is lower than the set switching pressure, a switching valve outputs the output pressure directly to the frictional element (i.e. the low-and-reverse brake).

On the other hand, in a circuit shown in FIG. 6 of the above-mentioned publication, if the output pressure Po has become equal to or higher than the set switching pressure, the switching valve outputs a line pressure PL instead of the output pressure Po to the low-and-reverse brake to ensure a large torque capacity required for engagement of the low-and-reverse brake.

Further, in a circuit shown in FIG. 9 of the above-mentioned publication, if a pressing force generated by the line pressure has become larger than a pressing force generated by a spring, the switching valve outputs the line pressure PL to the low-and-reverse brake.

The above-described conventional control device has the disadvantage that it is impossible to freely set the timing for switching the switching valve since the timing for switching the switching valve is uniquely defined by the set spring force.

If an R (rearward) range is selected while a vehicle is running forward, oil pressure must be inhibited from being supplied to the low-and-reverse brake so as to prevent the low-and-reverse brake from being engaged, because the low-and-reverse brake is the frictional element that is engaged at the forward-driving low speed gear positions and the rearward-driving gear position. Further, in the case where a power supply has failed, oil pressure must be supplied to the low-and-reverse brake if the R range is selected, and oil pressure must be inhibited from being supplied to the low-and-reverse brake if a D range is selected. The above-described conventional control device, however, cannot satisfy these requirements.

Specifically, in the circuit shown in FIG. 6 of the above-mentioned publication, if the solenoid valve is a normal-high type solenoid valve (which outputs oil pressure when no current is carried), when the R range is selected in the case where the power supply has failed, oil pressure supplied from the pressure reduction control valve switches the switching valve to supply the line pressure to the low-and-reverse brake. Even if the D range is selected, however, the oil pressure is supplied to the low-and-reverse brake.

Further, although the circuit shown in FIG. 9 of the above-mentioned publication is capable of inhibiting the low-and-reverse brake from being engaged if the R range is selected by mistake while the vehicle is running forward, the range of control is restricted because the line pressure must be kept at a low pressure. Further, irrespective of whether a normal-high type solenoid valve or a normal-low type solenoid valve (which outputs no oil pressure when no current is carried) is used, oil pressure is supplied to the low-and-reverse brake if the R range or the D range is selected in the case where the power supply has failed.

To satisfy all of the above requirements, i.e. to ensure the freedom of setting the timing for switching the switching valve, the conventional control device requires an additional solenoid valve that is used to switch the switching valve. Further, to satisfy the requirements when the R range is selected while the vehicle is running forward and in the case where the power supply has failed, the conventional control device must be provided with an increased number of parts such as an additional switching valve. This makes it impossible to reduce the size of the control device, and increases the cost.

SUMMARY OF THE INVENTION

It is therefore an object of the present invention to provide a control device for an automatic transmission, which inhibits a gear shift to a rearward-driving gear position even if an R range is selected while a vehicle is running forward, and enables the vehicle to run rearward even in the case where a power supply has failed, while providing accurate hydraulic control and ensuring the torque capacity required for engagement of a frictional element with only a small number of additional parts.

To attain the above object, the present invention provides a control device for an automatic transmission, comprising: a first solenoid valve capable of outputting a first solenoid pressure; a second solenoid valve capable of outputting a second solenoid pressure; a pressure reduction control valve that outputs an oil pressure controlled to be reduced based on a supplied original pressure if the second solenoid pressure is supplied, and inhibits the original pressure from being outputted if the second solenoid pressure is unsupplied; and a first shift valve that is selectively switched such that an output from the pressure reduction control valve is supplied to a first frictional element engaged at gear positions including a rearward-driving gear position if the first solenoid pressure is supplied, and that an R range pressure which is a line pressure supplied from a manual valve and generated only in a case where an R range is selected is supplied to the first frictional element if the first solenoid pressure is unsupplied.

If the R range is selected, both the first solenoid pressure and the second solenoid pressure are supplied to output an oil pressure reduced by the pressure reduction control valve according to the second solenoid pressure. Since the gain of the pressure reduction control valve can be set to a small value, it is possible to provide accurate control in a gear change or the like. The oil pressure thus reduced is supplied to the first frictional element via the first shift valve to engage the first frictional element to enable a shift to the rearward-driving gear position.

In this state, by stopping the supply of the first solenoid pressure and switching the first shift valve, the R range pressure is supplied instead of the reduced control pressure to the first frictional element to engage the first frictional element. Since the R range pressure is equal to the line pressure, it is possible to ensure the required transmission torque capacity required after the engagement.

If the R range is selected by mistake while the vehicle is running forward, the first solenoid pressure is supplied and the supply of the second solenoid pressure is stopped in response to detection of the R range selection.

This causes the first shift valve to connect the first frictional element with the pressure reduction control valve, but inhibits the pressure reduction control valve from outputting oil pressure. Therefore, the first frictional element is not engaged to inhibit a shift to the rearward-driving gear position.

Further, since neither the first solenoid pressure nor the second solenoid pressure is supplied in the case where the power supply has failed, the selection of the R range causes the R range pressure to be supplied via the first shift valve to the first frictional element to engage the first frictional element and enable a shift to the rearward-driving gear position. On the other hand, the selection of the D range causes the first shift valve to connect the first frictional element with the R range pressure, but the first frictional element is not engaged since no R range pressure is supplied.

BRIEF DESCRIPTION OF THE DRAWINGS

FIG. 2 is a table showing the combinations of engaged or disengaged frictional elements;

FIG. 5 is a table showing whether respective elements of the control circuit are operated or unoperated;

DETAILED DESCRIPTION OF THE PREFERRED EMBODIMENT

The present invention will now be described in detail with reference to the accompanying drawings showing an embodiment thereof.

Figure 1:
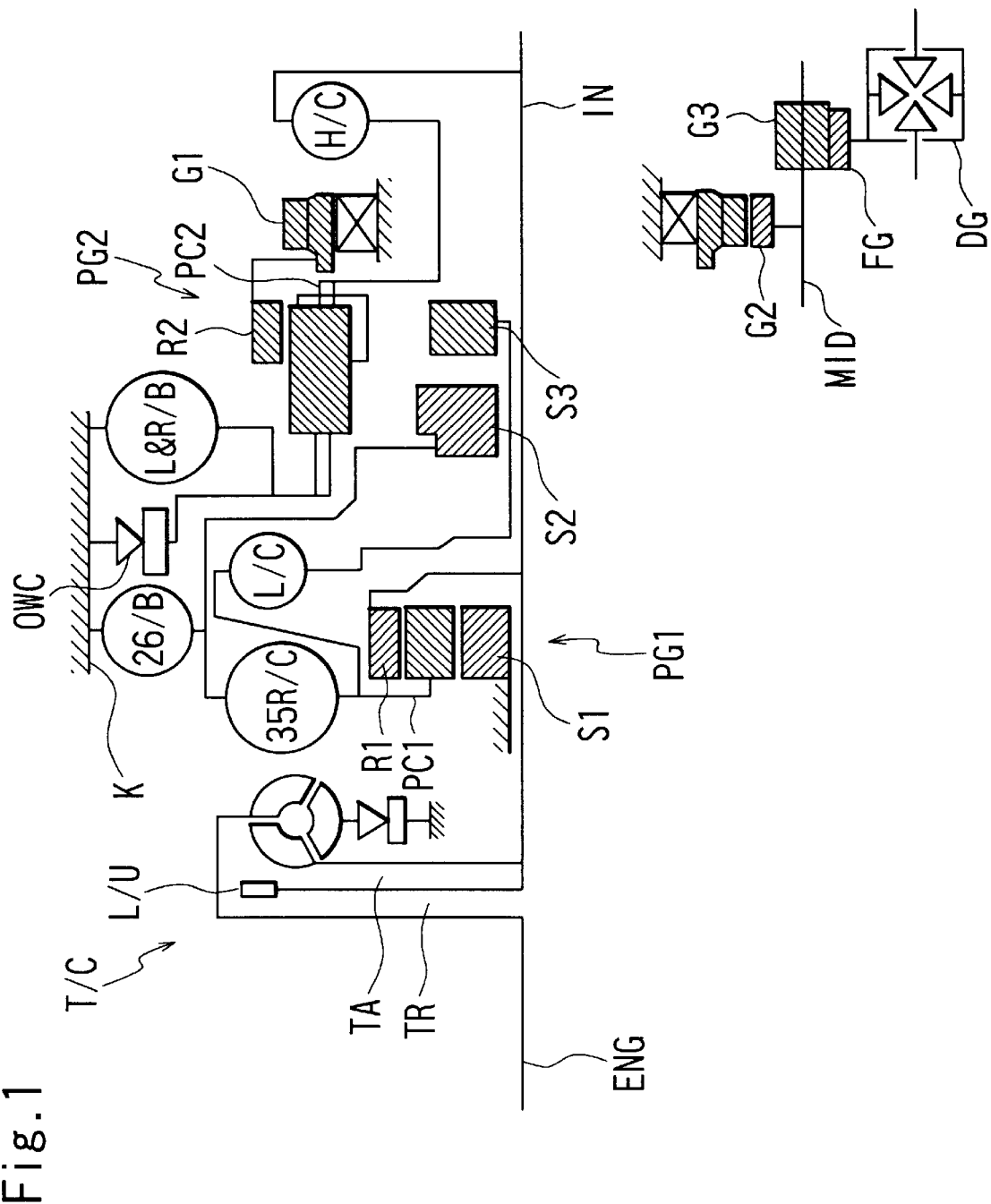
FIG. 1 is a view showing a transmission mechanism of an automatic transmission to which is applied an embodiment of the present invention.

FIG. 1 shows an example of a transmission mechanism of an automatic transmission to which is applied a hydraulic control device according to an embodiment of the present invention.

The transmission mechanism is comprised of a first planetary gear mechanism PG1 and a second planetary gear mechanism PG2, which are disposed along a transmission input shaft IN.

A torque outputted from an engine output shaft ENG is inputted to the transmission input shaft IN via a torque converter T/C. A lock-up clutch L/U is annexed to the torque converter T/C.

Figure 4:
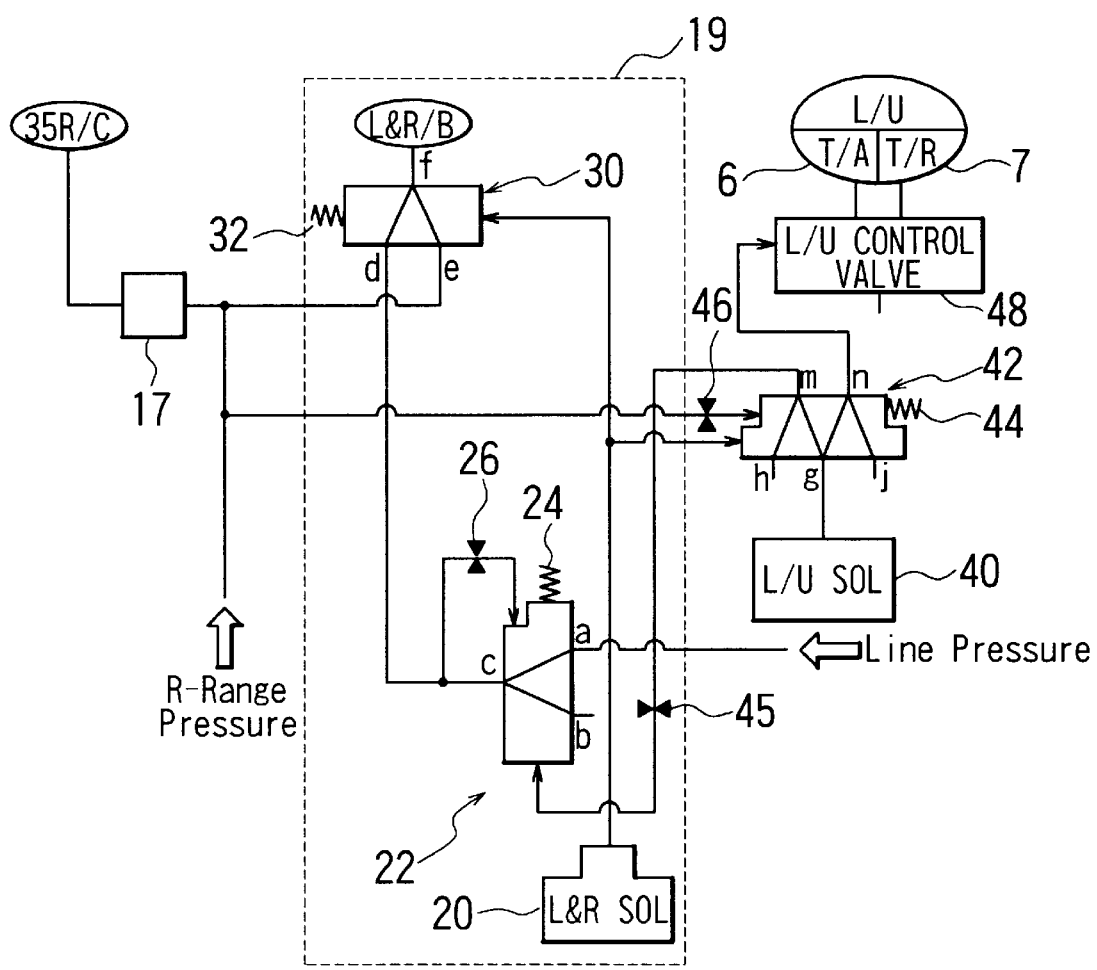
FIG. 4 is a view showing a control circuit for a low-and-reverse brake and a lock-up clutch.

The lock-up clutch L/U has an apply chamber TA and a release chamber TR (refer to FIG. 4). The supply of an apply pressure to the apply chamber TA connects the engine output shaft ENG and the transmission input shaft IN to each other, and the supply of a release pressure to the release chamber TR disconnects the engine output shaft ENG and the transmission input shaft IN from each other.

The first planetary gear mechanism PG1 includes a first ring gear R1 connected to the transmission input shaft IN, and a first sun gear S1 fixed on a case K. The first planetary gear mechanism PG1 also includes a first pinion carrier PC1 that is connected to the case K via a 35R clutch 35R/C and a 26 brake 26/B.

The second planetary gear mechanism PG2 is a Ravigneaux type gear mechanism, and is comprised of a second pinion carrier PC2 with one end thereof connected to the case K via a low-and-reverse brake L&R/B and the other end thereof connected to the transmission input shaft IN via a high clutch H/C. A one-way clutch OWC is disposed in parallel with the low-and-reverse brake L&R/B.

The second planetary gear mechanism PG2 is also comprised of a second sun gear S2 connected to the case K via the 26 brake 26/B, a third sun gear S3 connected to the 35R clutch 35R/C via a low clutch L/C, and a second ring gear R2 connected to a first output gear G1.

The first output gear G1 is engaged with an input gear G2 that is supported by a middle shaft MID disposed in parallel with the transmission input shaft IN, and a second output gear G3 on the middle shaft MID is engaged with a final gear FG having a differential gear DG.

The above-described clutches and brakes are engaged and disengaged in predetermined combinations to achieve six forward-driving gear positions (the first to sixth speeds) and one rearward-driving gear position as shown in FIG. 2. In FIG. 2, a circle mark indicates that the corresponding frictional element is engaged.

Figure 3:
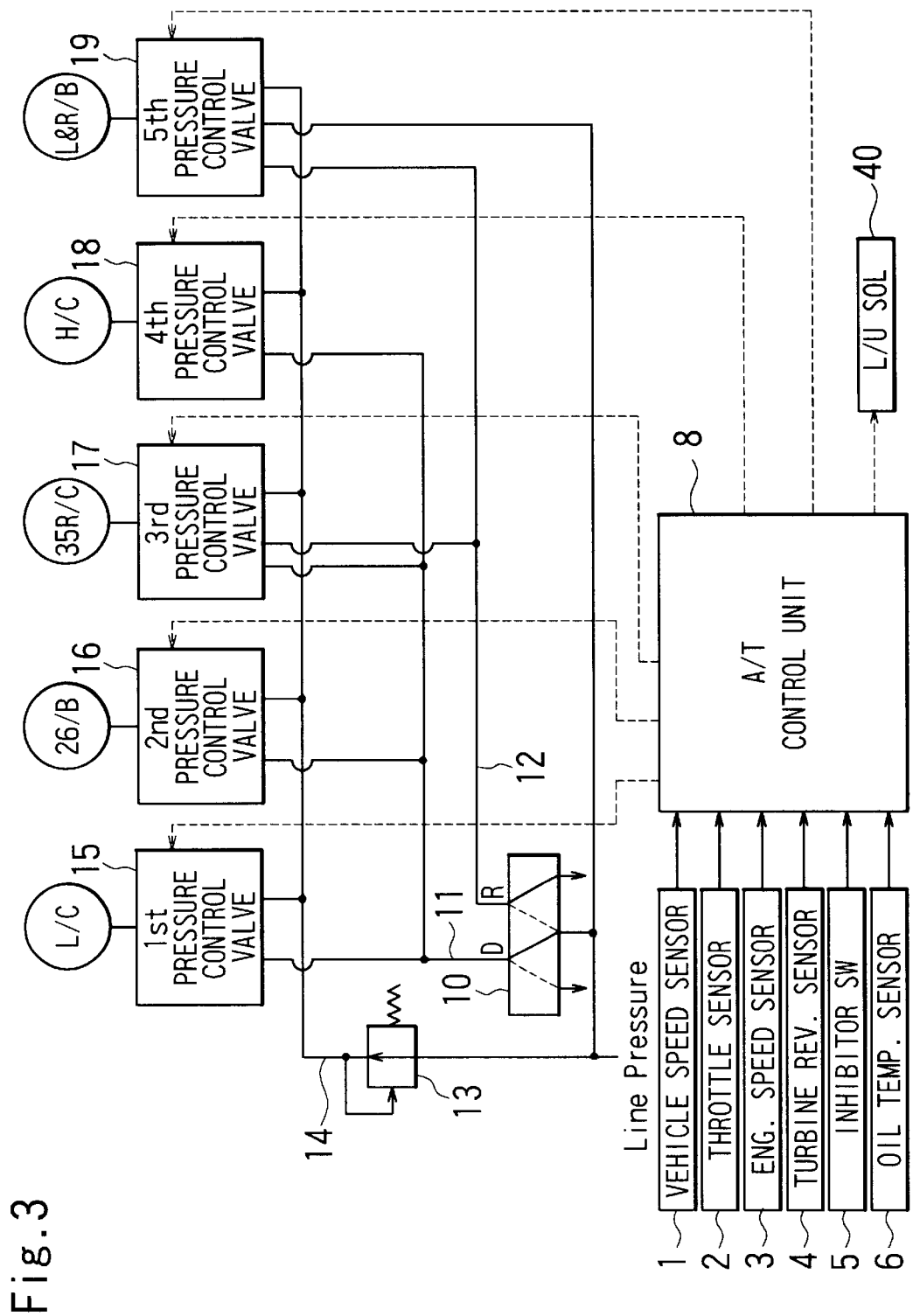
FIG. 3 is a view showing a hydraulic control system that is intended to operate frictional elements.

FIG. 3 shows a hydraulic control system that is intended to operate the above-described frictional elements.

A manual valve 10 is a valve that is switched by manual selecting operation. If a D range is selected, the manual valve 10 outputs a line pressure to a D range pressure oil channel 11 and drains an R range pressure oil channel 12. If an R (rearward) range is selected, the manual valve 10 outputs the line pressure to the R range pressure oil channel 12 and drains the D range pressure oil channel 11.

A pilot valve 13 provides control to reduce the line pressure to a predetermined pilot pressure, and outputs the pilot pressure to pressure control valves and a pressure control section, described later, through a pilot pressure oil channel 14.

A first pressure control valve 15 is disposed in an oil channel extending to the low clutch L/C. The first pressure control valve 15 is controlled in accordance with a command from an AT control unit 8. It should be noted that the first pressure control valve 15 is provided with a regulating valve and a solenoid valve that receives the command from the AT control unit 8. The regulating valve, not shown, is actuated according to a solenoid pressure. The solenoid valve is operated based on the pilot pressure supplied through the pilot pressure oil channel 14. This also applies to other pressure control valves described later.

A second pressure control valve 16, a third pressure control valve 17, and a fourth pressure control valve 18 are disposed in oil channels extending to the 26 brake 26/B, 35R clutch 35R/C, and high clutch H/C, respectively. The respective pressure control valves 16, 17, 18 are controlled in accordance with commands from the AT control unit 8.

A pressure control section 19 is disposed in an oil channel extending to the low-and-reverse brake L&R/B.

The first to fourth pressure control valves 15, 16, 17, 18 are supplied with the line pressure as a D range pressure from the manual valve 10 through the D range pressure oil channel 11. The third pressure control valve 17 is also supplied with the line pressure as an R range pressure through the R range pressure oil channel 12. The pressure control section 19 is supplied with the R range pressure through the R range pressure oil channel 12, and is directly supplied with the line pressure.

The AT control unit 8 determines a gear position suitable for driving conditions in response to signals indicating the vehicle speed, engine speed, turbine revolutionary speed, select lever position, and hydraulic oil temperature from a vehicle speed sensor 1, throttle sensor 2, engine speed sensor 3, turbine revolutionary speed sensor 4, inhibitor switch 5, and oil temperature sensor 6, respectively. The AT control unit 8 transmits the commands to the respective pressure control valves and the pressure control section so as to engage or disengage the low clutch L/C, 26 brake 26/B, 35R clutch 35R/C, high clutch H/C, and low-and-reverse brake L&R/B as the frictional elements in combinations suitable for the determined gear position.

The AT control unit 8 also transmits an command to a lock-up solenoid valve (L/U SOL) 40 to control the engagement and disengagement of the lock-up clutch L/U.

A detailed description will now be given of the pressure control section 19 for the low-and-reverse brake L&R/B as well as the control circuit for the lock-up clutch L/U.

As shown in FIG. 4, the pressure control section 19 includes an on-off type low-and-reverse solenoid valve (L&R SOL 20), pressure reduction control valve 22, and shift valve 30.

The lock-up clutch control circuit includes a lock-up solenoid valve 40, shift valve 42, and lock-up control valve 48.

The lock-up solenoid valve 40 is a linear control solenoid valve or a duty cycle control solenoid valve.

The pressure reduction control valve 22 is a regulating valve having a spool. A solenoid pressure outputted from the lock-up solenoid valve 40 is applied to one end of the spool of the pressure reduction control valve 22 via the shift valve 42 and an orifice 45. A force generated by the spring 24 is applied to the other end of the spool of the pressure reduction control valve 22, and an output pressure from the pressure reduction control valve 22 is also applied to the other end of the spool of the pressure reduction control valve 22 via an orifice 26.

In the pressure reduction control valve 22, a force generated by the solenoid pressure from the lock-up solenoid valve 40 and a force generated by the spring 24 and the output pressure from the pressure reduction control valve 22 are applied oppositely to each other. At a position where these forces are balanced, a part of the line pressure supplied to an input port "a" is drained through a drain port "b" to reduce the line pressure. The pressure reduction control valve 22 outputs the resulting modulated pressure through an output port "c".

A solenoid pressure from the low-and-reverse solenoid valve 20 is applied to one end of the shift valve 30 for the low-and-reverse brake L&R/B, and a force by the spring 32 is applied to the other end of the shift valve 30. The low-and-reverse solenoid valve 20 is a normal-low type solenoid valve, which outputs no solenoid pressure when no current is carried, and outputs solenoid pressure when current is carried.

It should be noted that in the present embodiment, the low-and-reverse solenoid valve 20 corresponds to a first solenoid valve, and the lock-up solenoid valve 40 corresponds to a second solenoid valve. The output from the low-and-reverse solenoid valve 20 corresponds to a first solenoid pressure, and the output from the lock-up solenoid 40 corresponds to a second solenoid pressure. The lock-up clutch L/U corresponds to a second frictional element that makes no contribution to a shift to the rearward-driving gear position.

If current is carried through the low-and-reverse solenoid valve 20, the solenoid pressure outputted from the low-and-reverse solenoid valve 20 is applied to one end of the shift valve 30. Therefore, the shift valve 30 brings a first input port "d" thereof into communication with an output port "f" to enable the output pressure from the pressure reduction control valve 22 to be supplied to the low-and-reverse brake L&R/B.

If no current is carried through the low-and-reverse solenoid valve 20, no solenoid pressure is outputted from the low-and-reverse solenoid valve 20. In this case, the shift valve 30 brings a second input port "e" thereof into communication with the output port "f" to enable the R range pressure outputted from the manual valve 10 to be supplied to the low-and-reverse brake L&R/B.

It should be noted that the second input port "e" also lies in communication with the third pressure control valve 17 for the 35R clutch 35R/C. If the manual valve 10 has been switched to an R range position, the R range pressure is supplied to the 35R clutch 35R/C and the low-and-reverse brake L&R/B at the same time.

The solenoid pressure outputted from the low-and-reverse solenoid valve 20 is applied to a first pressure receiving surface at one end of a spool of the shift valve 42 for the lock-up solenoid valve 40, and the R range pressure outputted from the manual valve 10 is applied to a second pressure receiving surface at the one end of the spool of the shift valve 42. A force of a spring 44 is applied to the other end of the spool of the shift valve 42.

If the solenoid pressure outputted from the low-and-reverse solenoid valve 20 or the R range pressure or both of them is applied to the shift valve 42, the shift valve 42 brings an input port "g" thereof into communication with a first output port "m". This enables the solenoid pressure outputted from the lock-up solenoid valve 40 to be applied to one end of the pressure reduction control valve 22. On this occasion, a second output port "n" connected to the lock-up control valve 48 is brought into communication with a second drain port "j".

If no oil pressure is applied to the pressure receiving surfaces formed at the one end of the shift valve 42, the input port "g" is brought into communication with the second output port "n" to cause the solenoid pressure outputted from the lock-up solenoid valve 40 to be supplied to the lock-up control valve 48 to enable lock-up. On the other hand, the first output port "m" is brought into communication with a first drain port "h" to inhibit the solenoid pressure from being supplied to the pressure reduction control valve 22.

The lock-up control valve 48 is intended to supply and drain oil pressures to and from the apply chamber TA and the release chamber TR of the lock-up clutch L/U. The lock-up control valve 48 is constructed as shown in FIG. 1 and other figures of Japanese Laid-Open Patent Publication No. 11-37280, for example.

With the above-described arrangement, the shift valve 30, shift valve 42, pressure reduction control valve 22, lock-up solenoid valve 40, and low-and-reverse solenoid valve 20 are operated or unoperated as shown in a table of FIG. 5.

Each case will be described below with reference to FIGS. 6 to 13. Thick lines in FIGS. 6 to 13 indicate an area where oil pressure is generated.

(Case 1)

In the case where the R range is selected (except that an engine is stalled in the R range), there is the necessity of accurately controlling an oil pressure to be supplied to the low-and-reverse brake L&R/B.

Figure 6:
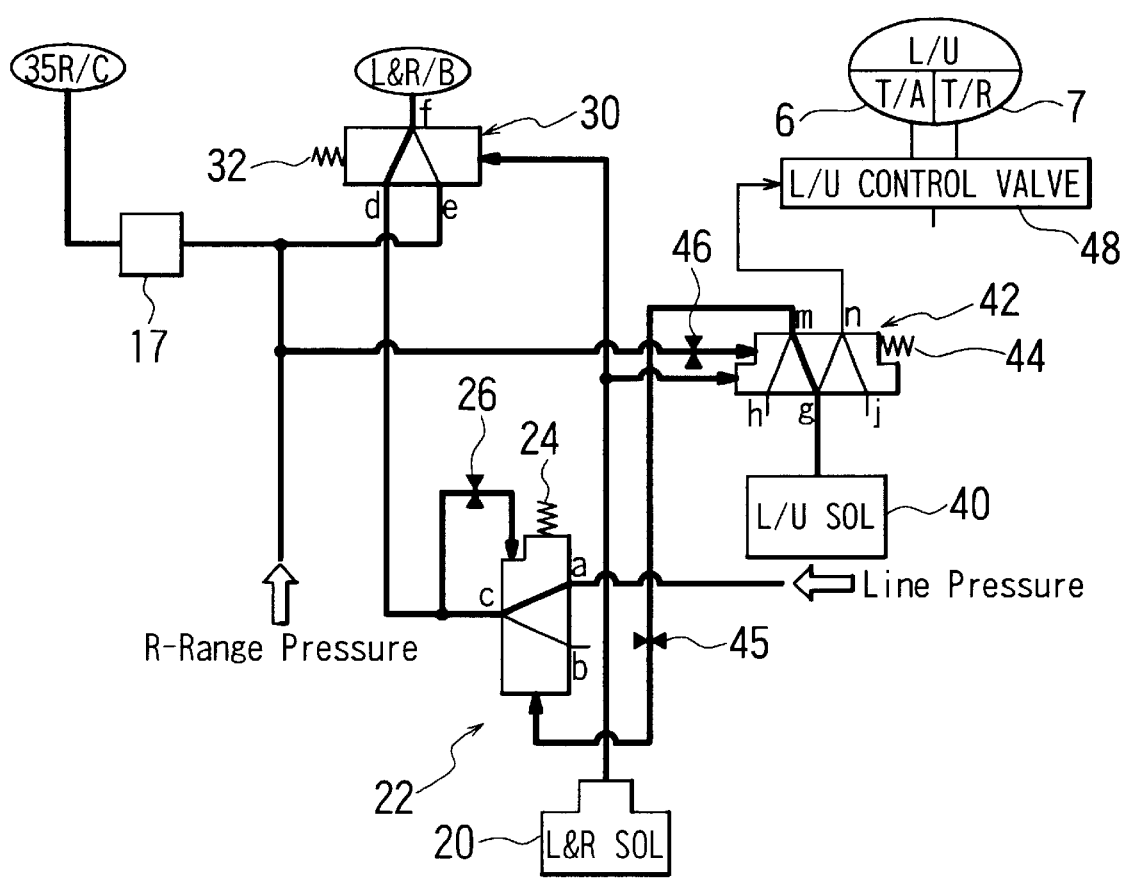
FIG. 6 is a view showing how the automatic transmission is controlled if an R range is selected.

Accordingly, as shown in FIG. 6, current is carried through both the low-and-reverse solenoid valve 20 and the lock-up solenoid valve 40 so that they can output the respective solenoid pressures. In response to selection of the R range, the R range pressure is outputted from the manual valve 10.

The shift valve 42 for the lock-up clutch L/U receives the solenoid pressure from the low-and-reverse solenoid valve 20 via the first pressure receiving surface, and receives the R range pressure via the second pressure receiving surface. This brings the input port "g" into communication with the first output port "m", and brings the second output port "n" into the second drain port "j".

Therefore, the solenoid pressure outputted from the lock-up solenoid valve 40 is applied to one end of the pressure reduction control valve 22 for the low-and-reverse brake L&R/B via the shift valve 42. This causes the line pressure supplied through the input port "a" to be regulated. The regulated oil pressure is supplied to the first input port "d" of the shift valve 30 through the output port "c" of the pressure reduction control valve 22.

The shift valve 30 for the low-and-reverse brake L&R/B receives at one end thereof the solenoid pressure outputted from the low-and-reverse solenoid valve 20 to bring the first input port "d" into communication with the output port "f". This causes the output pressure reduced by the pressure reduction control valve 22 to be supplied to the low-and-reverse brake L&R/B.

This makes it possible to set the gain of the output pressure supplied to the low-and-reverse brake L&R/B with respect to the solenoid pressure outputted from the lock-up solenoid valve 40 to a small value, and enables accurate control of the low-and-reverse brake pressure.

On the other hand, the R range pressure outputted from the manual valve 10 is supplied to the second input port "e" of the shift valve 30 but does not reach the low-and-reverse brake L&R/B. The R range pressure, however, is supplied to the third pressure control valve 17.

Therefore, both the 35R clutch 35R/C and the low-and-reverse brake L&R/B are operated to enable a shift to achieve the rearward-driving gear position.

(Case 2)

Figure 7:
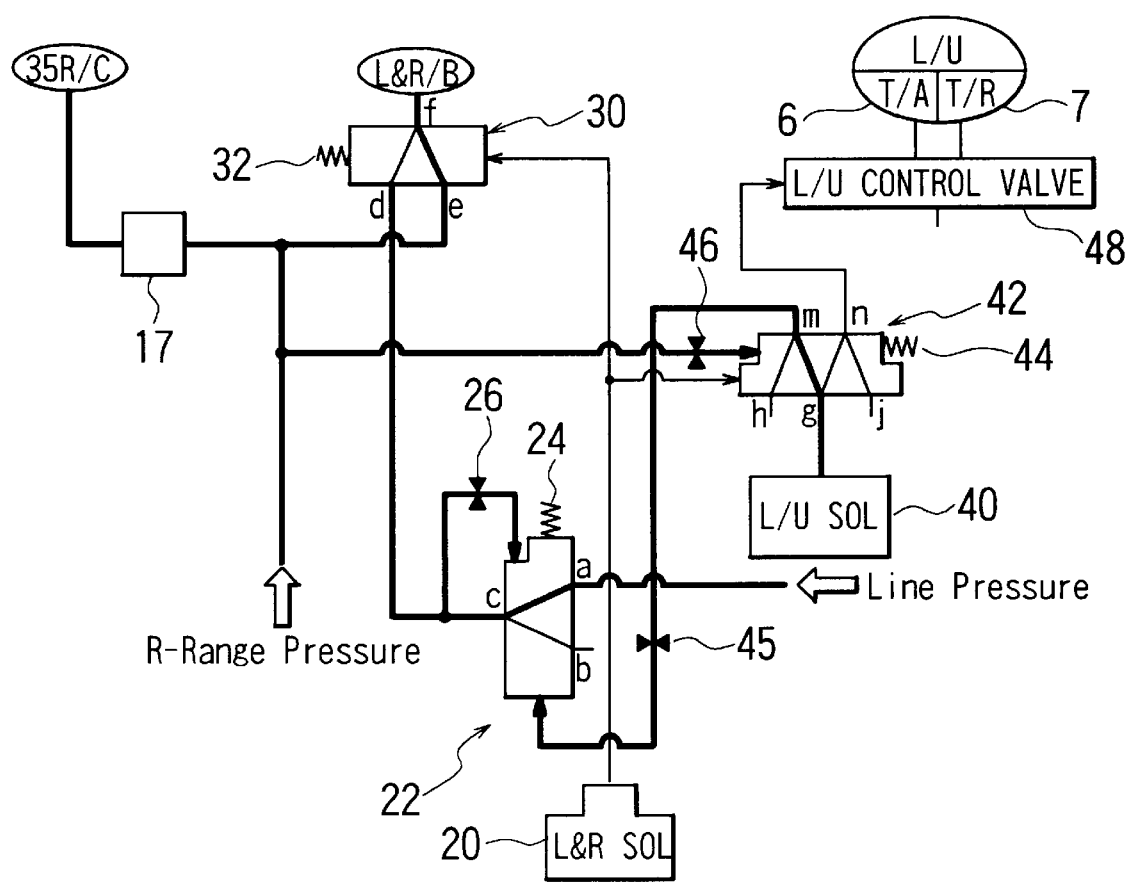
FIG. 7 is a view showing how the automatic transmission is controlled when an engine is stalled if the R range is selected.

In the case where the engine is stalled in the R range, there is the necessity of applying a high pressure to the low-and-reverse brake L&R/B. Accordingly, as shown in FIG. 7, current is carried through the lock-up solenoid valve 40, whereas no current is carried through the low-and-reverse solenoid valve 20.

The R range pressure is outputted from the manual valve 10 as in the case 1.

Although the shift valve 42 and the pressure reduction control valve 22 lie in the same state as in the case 1, the shift valve 30 brings the second input port "e" thereof into communication with the output port "f".

Therefore, the R range pressure equal to the high line pressure is supplied to the low-and-reverse brake L&R/B through the second input port "e" of the shift valve 30, and this ensures the required large torque capacity.

In this case, the R range pressure is supplied to the 35R clutch 35R/C to enable a shift to the rearward-driving gear position as in the case 1.

(Case 3)

Figure 8:
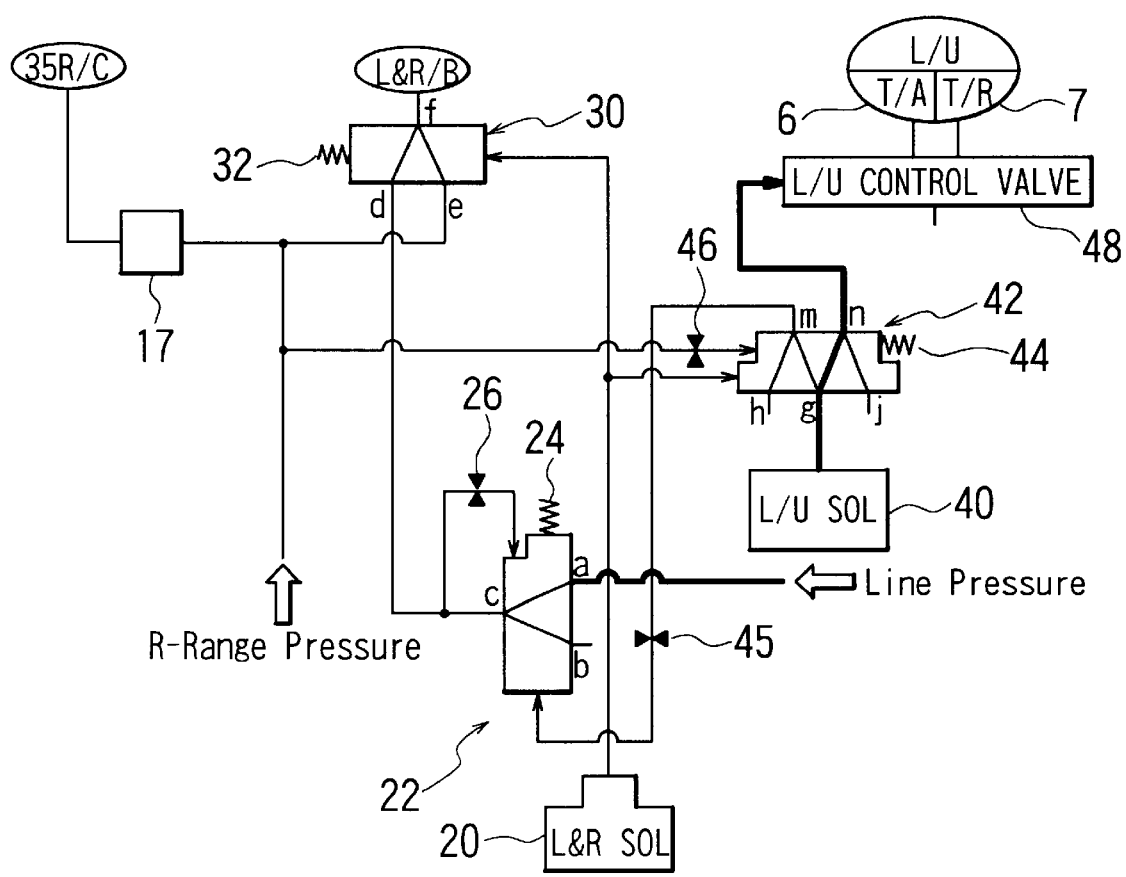
FIG. 8 is a view showing how the automatic transmission is controlled when a vehicle is running at the first speed with an engine brake being unoperated.

In the case where the vehicle runs at the first speed gear position with the engine brake being unoperated, there is no necessity of operating the low-and-reverse brake L&R/B. Accordingly, as shown in FIG. 8, the low-and-reverse solenoid valve 20 is not actuated.

However, the D range pressure (line pressure) outputted from the manual valve 10 engages the low clutch L/C. This enables the vehicle to run forward at the first speed gear position due to mechanical operation of the one-way clutch OWC.

The oil pressure is drained from the low-and-reverse brake L&R/B via the R range pressure oil channel through the second input port "e" of the shift valve 30.

In this case, neither the R range pressure nor the solenoid pressure from the low-and-reverse solenoid valve 20 is generated, and thus, the shift valve 42 brings the first output port "m" into communication with the first drain port "h" and brings the second output port "n" into communication with the input port "g".

On the other hand, the lock-up solenoid valve 40 is operated, so that the solenoid pressure from the lock-up solenoid valve 40 is supplied to the lock-up control valve 48 via the shift valve 42.

The amount of the solenoid pressure is controlled by the lock-up solenoid valve 40 to control the lock-up control valve 48. Specifically, the supply and drain of the oil pressures to and from the apply chamber TA and the release chamber TR of the lock-up clutch L/U enables control of the lock-up clutch L/U.

It should be noted that in this case, the solenoid pressure from the lock-up solenoid valve 40 is not applied to the pressure reduction control valve 22, and therefore, the line pressure supplied to the input port "a" is not outputted from the output port "c".

(Case 4)

Figure 9:
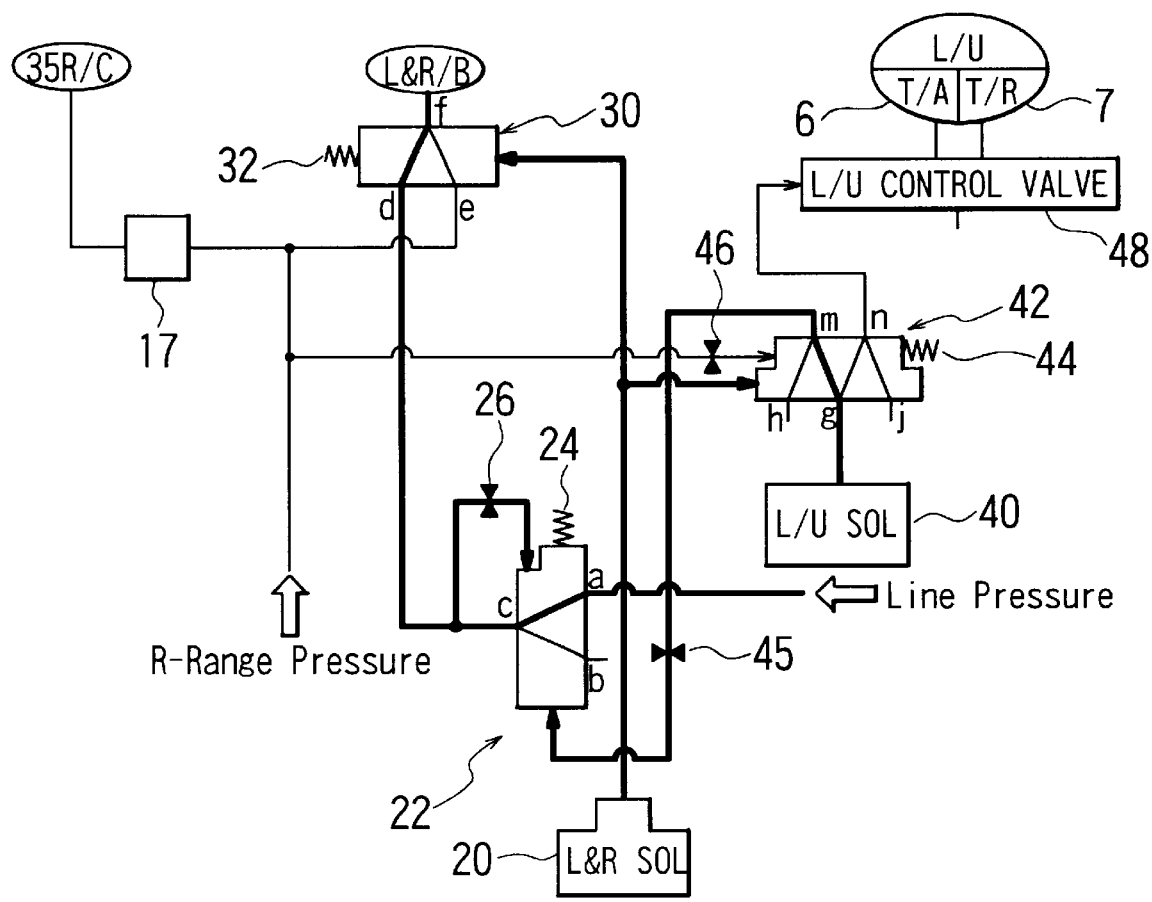
FIG. 9 is a view showing how the automatic transmission is controlled when the vehicle is running at the first speed with the engine brake being operated.

In the case where the vehicle runs at the first speed gear position with the engine brake being operated, there is the necessity of operating the low-and-reverse brake L&R/B. Accordingly, as shown in FIG. 9, both the lock-up solenoid valve 40 and the low-and-reverse solenoid valve 20 are operated as shown in FIG. 9.

The R range pressure is not supplied from the manual valve 10 differently from the case 1, but the pressure reduction control valve 22, shift valve 30, and shift valve 42 lie in the same state as in the case 1. Therefore, the output pressure regulated by the pressure reduction control valve 22 is supplied to the low-and-reverse brake L&R/B to engage the low-and-reverse brake L&R/B.

On the other hand, the D range pressure supplied from the manual valve 10 engages the low-clutch L/C, and this enables the vehicle to run forward at the first speed gear position.

Therefore, the vehicle can run forward at the first speed gear position with the engine brake being operated.

(Case 5)

Figure 10:
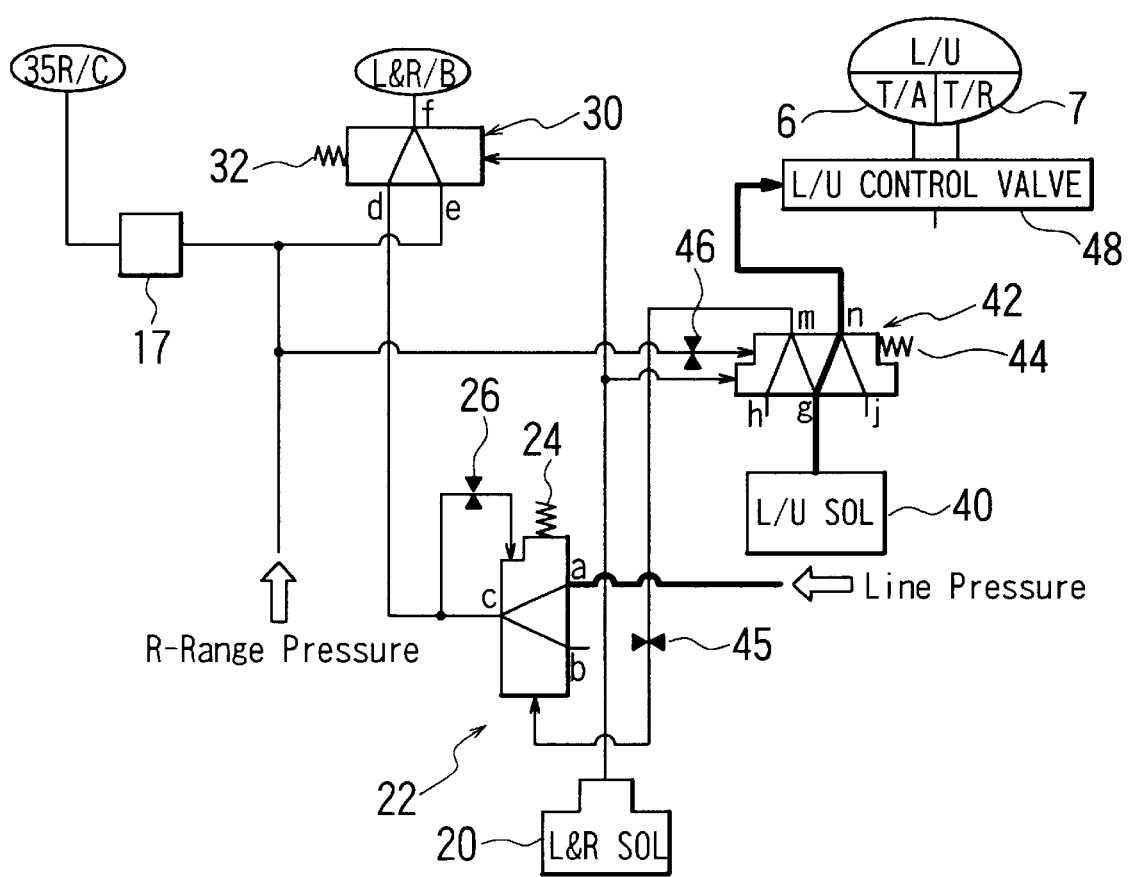
FIG. 10 is a view showing how the automatic transmission is controlled when the vehicle is driving forward in the locked-up state.

In the case where the vehicle is running forward (FWD) in the locked-up state for improvement of the fuel economy or the like, only the lock-up solenoid valve 40 is operated and the low-and-reverse solenoid valve 20 is unoperated as shown in FIG. 10 as in the case 3.

When the vehicle is running at other gear positions than the first speed, the respective frictional elements are engaged or disengaged according to the gear positions as shown in the table of FIG. 2.

(Case 6)

Figure 11:
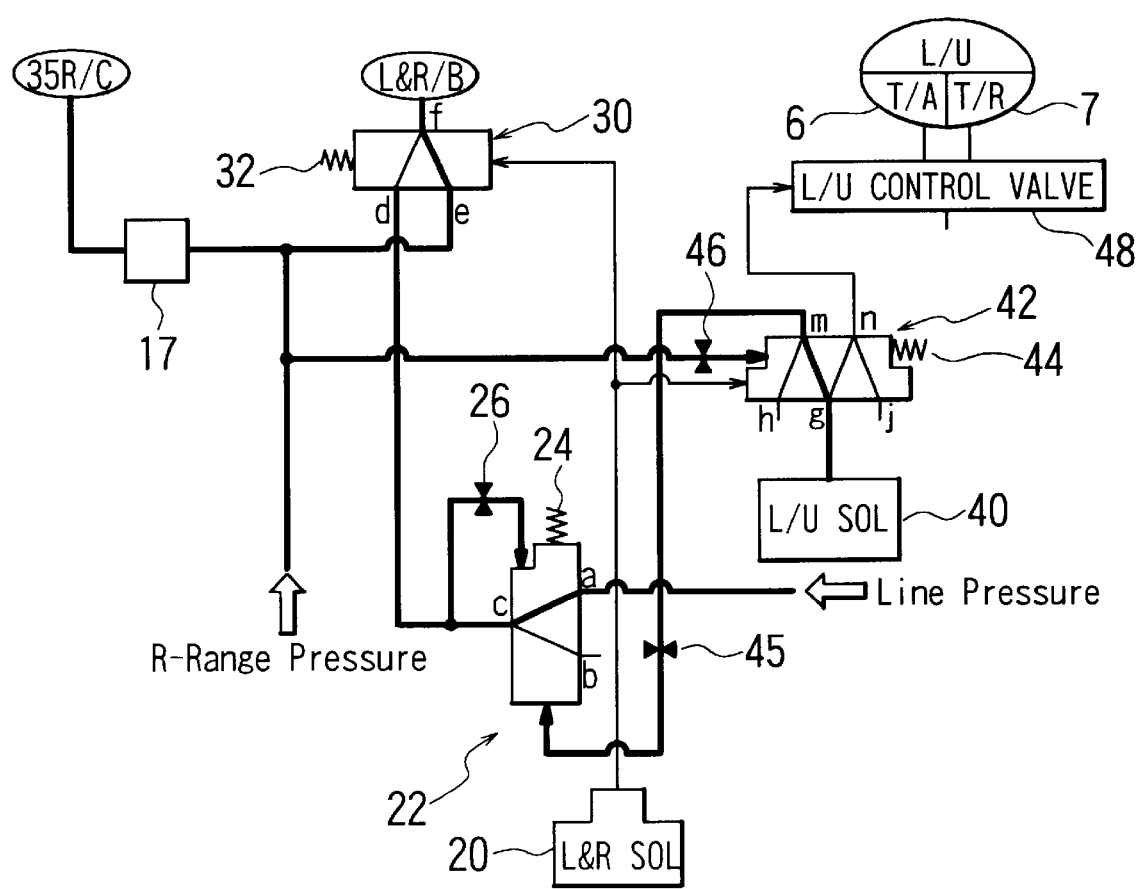
FIG. 11 is a view showing how the automatic transmission is controlled immediately after the R range is selected while the vehicle is running forward in the locked-up state.

In the case where the R range is selected while the vehicle is running forward in the locked-up state, the automatic transmission lies in the same state as in the case 5. If a driver selects the R range by mistake with a selecting lever, however, the manual valve 10 immediately outputs the R range pressure as shown in FIG. 11. The R range pressure starts being supplied to the third pressure control valve 17, shift valve 30, and shift valve 42.

Immediately after the selection of the R range, the low-and-reverse solenoid valve 20 is unoperated since it takes some time to operate the low-and-reverse solenoid valve 20. In the meantime, the second input port "e" of the shift valve 30 lies in communication with the output port "f", and thus, the R range pressure starts being supplied to the low-and-reverse brake L&R/B.

On the other hand, in response to the R range pressure, the shift valve 42 for the lock-up solenoid valve is switched to bring the input port "g" and the first output port "m" into communication with each other, and bring the second drain port "j" and the second output port "n" into communication with each other.

Therefore, the solenoid pressure that has been outputted from the lock-up solenoid valve 40 to the lock-up control valve 48 in order to control the lock-up clutch L/U is not supplied to the lock-up control valve 48 any longer. The pressure reduction control valve 22 is then switched to guide the output pressure therefrom to the first input port "d" of the shift valve 30. Since the second input port "e" of the shift valve 30 lies in communication with the output port "f", however, the output pressure from the pressure reduction control valve 22 is intercepted by the shift valve 30.

At the same time, the solenoid pressure that has been outputted to the lock-up control valve 48 is drained through the second drain port "j" of the shift valve 42 to disengage the lock-up clutch L/U.

As described above, immediately after the selection of the R range, the R range pressure quickly starts being supplied to the 35R clutch 35R/C and the low-and-reverse brake L&R/B as the frictional elements required for a shift to the rearward-driving gear position, whereas the lock-up clutch L/U starts being disengaged.

Figure 12:
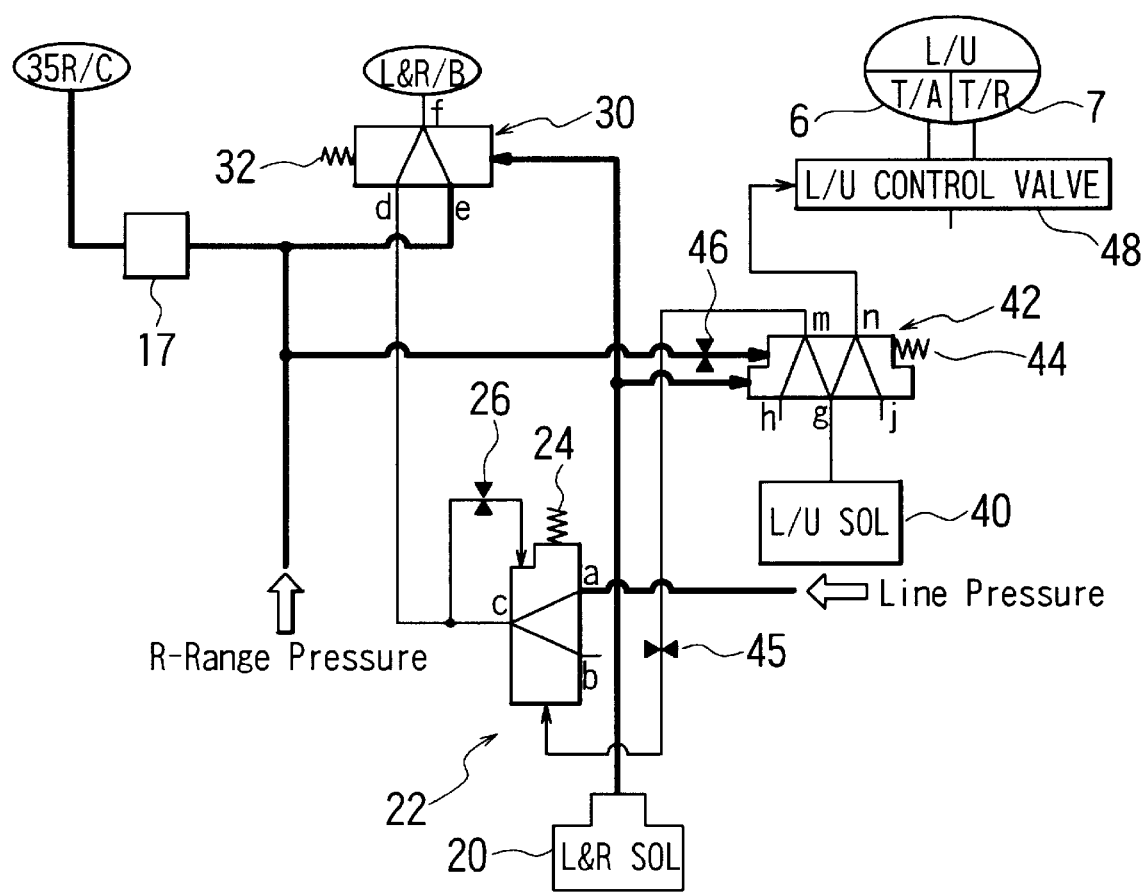
FIG. 12 is a view showing how the automatic transmission is controlled in the case where a shift to a rearward-driving gear position is avoided.

On the other hand, the selection of the R range is detected by the inhibitor switch 5 (refer to FIG. 3). In response to the detection of the selection, the lock-up solenoid valve 40 is immediately brought into the unoperated state, and the low-and-reverse solenoid valve 20 is operated as shown in FIG. 12. The solenoid pressure from the low-and-reverse solenoid valve 20 switches the shift valve 30 slightly later than the supply of the R range pressure, and thus, the shift valve 30 lies in the same state as in FIG. 11 immediately after the selection of the R range.

The lock-up solenoid valve 40 is switched to be unoperated, and the solenoid pressure is not supplied to the lock-up control vale 48 any longer, to keep the lock-up clutch disengaged. The pressure reduction control valve 22 is not supplied with the solenoid pressure any longer, and is switched to inhibit the line pressure supplied to the input port "a" from being supplied to the shift vale 30 for the low-and-revere brake L&R/B.

The solenoid pressure outputted from the low-and-reverse solenoid valve 20 switches the shift valve 30 to bring the first input port "d" and the output port "f" into communication with each other, and shut off the communication between the second input port "e" and the output port "f".

Therefore, the supply of the R range pressure to the low-and-reverse brake L&R/B is stopped, and oil in the low-and-reverse brake L&R/B is drained through the drain port "d" of the pressure reduction control valve 22.

Since the low-and-reverse brake L&R/B is not engaged, the transmission mechanism is not brought into the state that enables the vehicle to run rearward even if the 35R clutch 35R/C is engaged. The transmission mechanism is brought into a neutral state. Therefore, even if the driver selects the R range by mistake while the vehicle is running forward, it is possible to ensure the driving safety and prevent the automatic transmission and the like from being damaged.

(Case 7)

Figure 13:
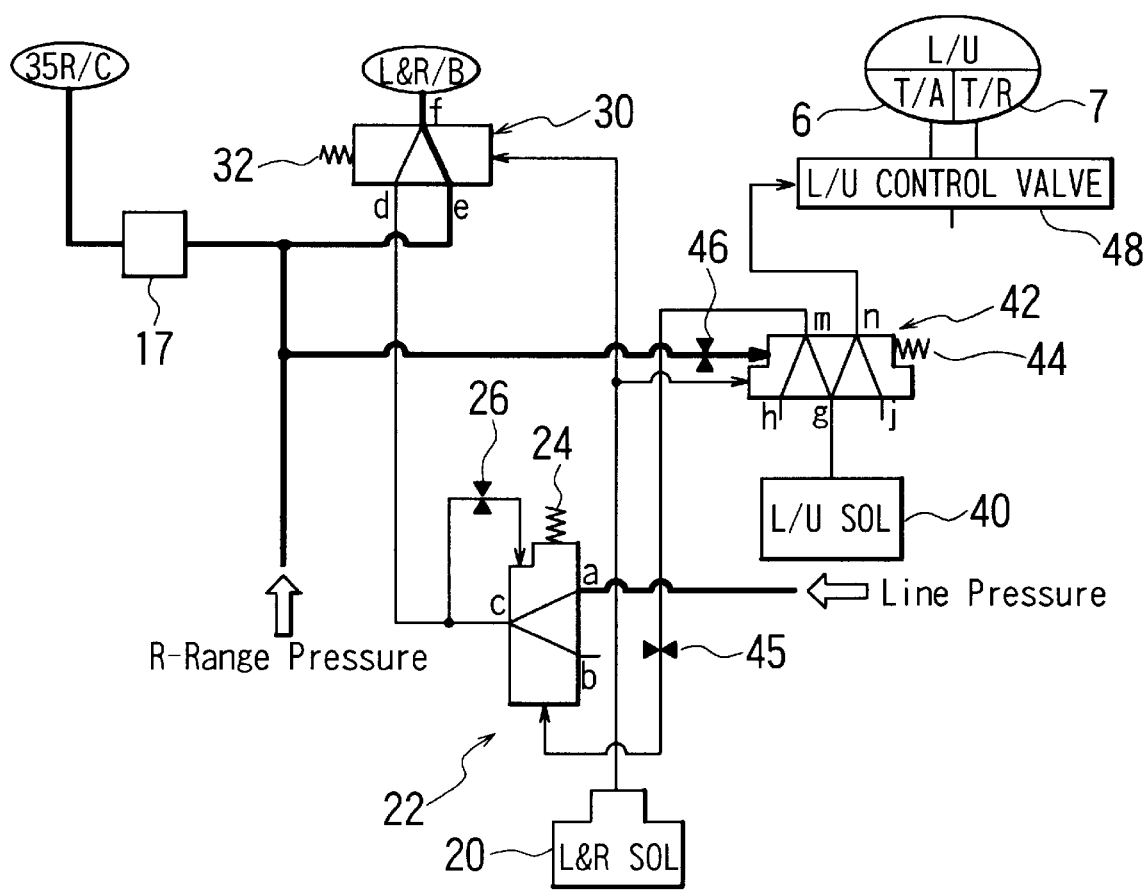
FIG. 13 is a view showing how the automatic transmission is controlled if the R range is selected in the case where a power supply has failed.

In the case where the R range is selected if a power supply has failed, the lock-up solenoid valve 40 and the low-and-reverse solenoid valve 20 are unoperated as shown in FIG. 13 since it is impossible to supply current.

Thus, no solenoid pressure is outputted from the lockup solenoid valve 40 to the lock-up control valve 48, and therefore, the lock-up clutch L/U is disengaged. The pressure reduction control valve 22 intercepts the line pressure and generates no output pressure, and thus, no output pressure is supplied to the shift valve 30 for the low-and-reverse brake.

Namely, the second input port "e" of the shift valve 30 lies in communication with the output port "f", and the R range pressure outputted from the manual valve 10 is supplied to the low-and-reverse brake L&R/B via the shift valve 30 to engage the low-and-reverse brake L&R/B. The R range pressure is also supplied to the third pressure control valve 17 to engage the 35R clutch 35R/C.

This enables the vehicle to run rearward and causes the R range pressure equal to the line pressure to be supplied, thus ensuring a large torque capacity required when the engine is stalled in the R range.

(Case 8)

Figure 14:
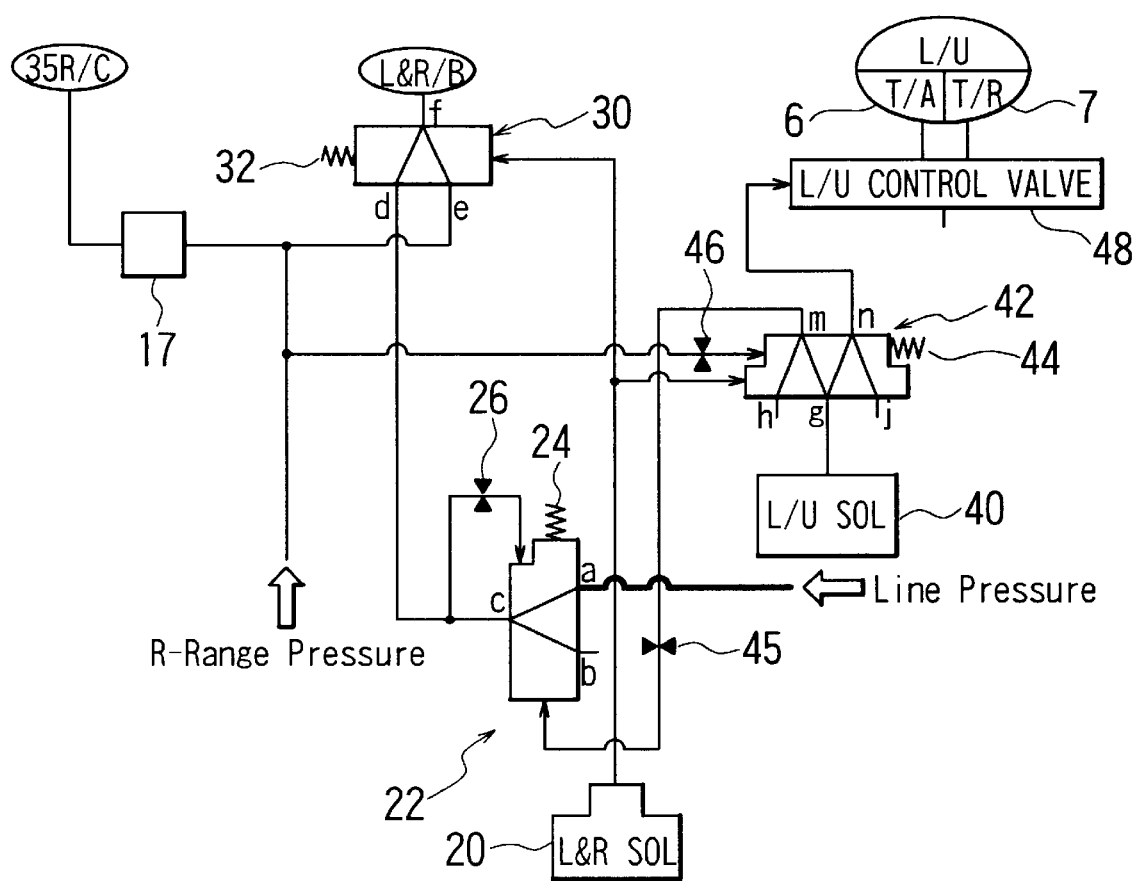
FIG. 14 is a view showing how the automatic transmission is controlled if a D range is selected in the case where the power supply has failed.

In the case where the D range is selected if the power supply has failed, neither the lock-up solenoid valve 40 nor the low-and-reverse solenoid valve 20 is operated as shown in FIG. 14 since it is impossible to supply current. Due to the selection of the D range, no R range pressure is generated.

Thus, although the second input port "e" of the shift valve 30 lies in communication with the output port "f", the low-and-reverse brake L&R/B is disengaged since no R range pressure is generated.

As described above, the low-and-reverse brake L&R/B is disengaged whenever the D range is selected in the case where the power supply has failed.

According to the above-described embodiment, the shift valve 30 (first shift valve) can be switched in predetermined timing by operating the low-and-reverse solenoid valve 20 (first solenoid valve) in desired timing.

Further, according to the above-described embodiment, the control circuit for the lock-up clutch is shared, and it is therefore possible to provide accurate control by making smaller the control gain of the pressure reduction control valve 22 and to ensure the stability even through oil pressures vary widely without additional parts. On the other hand, as the need arises, the shift valve 30 is switched to supply the high R range pressure to the low-and-reverse brake L&R/B (first frictional element) to ensure a large torque capacity.

Further, even if the R range is selected by mistake while the vehicle is running forward, the pressure reduction control valve 22 stops outputting the pressure and the shift vale 30 inhibits the supply of the R range pressure to the low-and-reverse brake L&R/B. This prevents the vehicle from being driven rearward, and ensures the driving safety and prevents the automatic transmission and the like from being damaged.

Further, even if the R range is selected in the case where the power supply has failed, the shift valve 30 enables the supply of the R range pressure to the low-and-reverse brake L&R/B to drive the vehicle rearward.

Further, according to the above-described embodiment, the control device includes a shift valve 42 (second shift valve).

The shift valve 42 is switched in response to at least one switching pressure of the first solenoid pressure outputted from the low-and-reverse solenoid valve 20 and the R range pressure. In response to the supply of the switching pressure, the shift valve 42 supplies the second solenoid pressure from the lock-up solenoid valve 40 (second solenoid valve) to the pressure reduction control valve 22. On the other hand, if the switching pressure is not supplied, the shift valve 42 is selectively switched to supply the second solenoid pressure to the lock-up clutch L/U (second frictional element) that does not contribute to a shift to the rearward-driving gear position.

Since the switching pressure is supplied from the low-and-reverse solenoid valve 20 to the shift valve 42, and the second solenoid pressure that controls the pressure reduction control valve 22 is supplied from the lock-up solenoid valve 40 for the lock-up clutch L/C, the necessity of providing a special solenoid valve and the like is eliminated. And it is therefore possible to considerably reduce the size of the control device and inhibit the increase in cost.

Further, according to the above-described embodiment, the low-and-reverse brake L&R/B as the first frictional element is engaged at the rearward-driving gear position and at the first speed gear position with the engine brake being operated.

If there is no necessity of operating the engine brake while the vehicle is running forward at the first speed gear position, the low-and-reverse solenoid valve 20 is unoperated and the shift valve 42 guides the second solenoid pressure to the lock-up clutch L/U to enable control of the lock-up clutch L/U. In this case, no R range pressure is generated and no pressure reduction control pressure is outputted, and thus, the low-and-reverse brake L&R/B is not operated. Therefore, while the vehicle is running forward with the engine brake being unoperated, the lock-up clutch L/C can be controlled using the lock-up solenoid valve 40 at the respective gear positions including the first speed gear position. This improves the fuel economy.

If the engine brake is required to be operated while the vehicle is running forward at the first speed gear position, both solenoid valves 20, 40 are operated to switch the shift valves 30, 42 to control the pressure reduction control valve 22 by the second solenoid pressure. The output pressure from the pressure reduction control valve 22, as the pressure reduction control pressure, is supplied to the low-and-reverse brake L&R/B via the shift valve 30 to engage the low-and-reverse brake L&R/B.

Further, since the lock-up solenoid valve 40 is the linear control solenoid valve or the duty cycle control solenoid valve, the amount of the second solenoid pressure to be supplied to the pressure reduction control valve 22 is variably controlled and outputted. This controls the pressure reduction control pressure to a desired pressure, and also controls the oil pressure to be supplied to the lock-up clutch L/U to a desired pressure.

Further, since the low-and-reverse solenoid valve 20 is the on-off type solenoid valve, the shift valves 30, 40 can be configured to be switched at a low cost.

It is to be understood that in the above-described embodiment, the lock-up control circuit is shared, this is not limitative, but a hydraulic section associated with the control of the other frictional elements may be used.

What is claimed is:

1. A control device for an automatic transmission, comprising:

a first solenoid valve capable of outputting a first solenoid pressure;

a second solenoid valve capable of outputting a second solenoid pressure;

a pressure reduction control valve that outputs an oil pressure controlled to be reduced based on a supplied original pressure if the second solenoid pressure is supplied, and inhibits the original pressure from being outputted if the second solenoid pressure is unsupplied; and a first shift valve that is selectively switched such that an output from said pressure reduction control valve to a first frictional element engaged at gear positions including a rearward-driving gear position if the first solenoid pressure is supplied, and that an R range pressure which is a line pressure supplied from a manual valve and generated only in a case where an R range is selected is supplied to the first frictional element if the first solenoid pressure is unsupplied.

2. A control device for an automatic transmission according to claim 1, comprising a second shift valve that is selectively switched in response at least one of the first solenoid pressure and the R range pressure as switching pressure, such that the second solenoid pressure is supplied to said pressure reduction control valve if the switching pressure is supplied, and the second solenoid pressure is supplied to a second frictional element that makes no contribution to a shift to the rearward driving gear positions if the switching pressure is unsupplied.

3. A control device for an automatic transmission according to claim 1, wherein the first frictional element is a low-and-reverse brake that is engaged at a rearward driving gear position and a first speed gear position with an engine brake being operated.

4. A control device for an automatic transmission according to claim 2, wherein the second frictional element is a lock-up clutch for a torque converter.

5. A control device for an automatic transmission according to any one of claims 1 to 3, wherein said second solenoid valve is a linear control solenoid valve or a duty cycle control solenoid valve.

6. A control device for an automatic transmission according to any one of claims 1 to 3, wherein said first solenoid valve is an on-off type solenoid valve.

* * * * *